(12) United States Patent
Pitz et al.

(10) Patent No.: US 6,240,058 B1
(45) Date of Patent: May 29, 2001

(54) DISK-CHANGING UNIT WITH MODULAR DESIGN

(75) Inventors: Ulrich Pitz, Ockenheim; Martin Görner, Waldalgesheim; Horst Schellong, Mainz; Börge Heidersberger, Bingen; Wolfgang Theil, Waldlaubersheim, all of (DE)

(73) Assignee: NSM Aktiengesellschaft, Bingen (DE)

( * ) Notice: Subject to any disclaimer, the term of this patent is extended or adjusted under 35 U.S.C. 154(b) by 0 days.

(21) Appl. No.: 09/214,596
(22) PCT Filed: Jul. 5, 1997
(86) PCT No.: PCT/DE97/01437
  § 371 Date: Apr. 27, 1999
  § 102(e) Date: Apr. 27, 1999
(87) PCT Pub. No.: WO98/02879
  PCT Pub. Date: Jan. 22, 1998

(30) Foreign Application Priority Data
  Jul. 11, 1996 (DE) .............................................. 196 27 929
  Oct. 28, 1996 (DE) .............................................. 196 44 690

(51) Int. Cl.[7] .......................... G11B 17/22; G11B 15/68
(52) U.S. Cl. ............................................ 369/178; 369/34
(58) Field of Search .................................. 369/34, 36, 38, 369/178, 179, 191, 192; 360/92, 98.04; 361/679, 683, 684, 685, 686

(56) References Cited

U.S. PATENT DOCUMENTS

| Re. 35,915 | * | 10/1998 | Hastings et al. ................... 360/97.01 |
| 5,122,914 | * | 6/1992 | Hanson ............................... 360/98.01 |
| 5,379,184 | * | 1/1995 | Barraza et al. ....................... 361/685 |
| 5,604,662 | * | 2/1997 | Anderson et al. .................... 361/685 |
| 5,717,570 | * | 2/1998 | Kikinis ................................. 361/685 |

* cited by examiner

*Primary Examiner*—David L. Ometz
(74) *Attorney, Agent, or Firm*—Venable; Robert Kinberg; Catherine M. Voorhees

(57) ABSTRACT

The invention concerns a disk-changing unit comprising a tower housing (1) in which is fitted at least one interchangeable disk magazine (13), at least one disk drive (14), if necessary a disk-loading/ejecting drawer (12), a transporting device (17) for moving a disk between the disk magazine (13), the disk drive (14) and if necessary the disk-loading/ejecting drawer (12), an operating device (6) and a computer-controlled control unit (9). To be able to assemble the disk-changing unit individually with the disk magazine (13), the disk drive (14) and if necessary the disk-loading/ejecting drawer (12), the disk magazine (13), the disk drive (14) and the disk-loading/ejecting drawer (12) have the same external dimensions and are modulatively fitted next to each other by being pushed in or pulled out of corresponding recesses (10) and can thus be interchanged, replaced an/or added to.

19 Claims, 3 Drawing Sheets

DISK-CHANGING UNIT WITH MODULAR DESIGN

BACKGROUND OF THE INVENTION

The invention relates to a disk-changing unit, in particular for CD disks, comprising a tower housing, at least one interchangeable disk magazine, at least one disk drive, and if applicable, a disk-loading/ejecting drawer having respectively the same outside dimensions and which can be interchanged, replaced or added in the manner of modules by inserting or removing them from respective receiving bays, comprising a transporting device for moving a disk between the disk magazine, the disk drive and, if applicable, the disk loading/ejecting drawer, an operating device and a computer-controlled control unit.

Such disk-changing units, which as a rule have several disk magazines and/or disk drives, are used in particular in data processing systems and computer systems. Tower housings are frequently used for computers that accommodate, among other things, disk drives, interface cards, slide-in printed circuit board modules, hard disks and a CD disk drive for reading and/or recording of information from or onto a CD disk.

EP 0 439 483 B1 discloses a disk playback unit with two interchangeable, opposite arranged disk magazines, which are fitted with disk holders holding respectively one disk and are positioned in horizontal receiving compartments. A transporting device that can be moved in a stacking direction of the disk magazines moves a desired CD disk with the associated disk holder back and forth between the receiving compartment of the respective disk magazine and a playback unit.

DE 39 31 715 A1 furthermore discloses a disk playback unit with an interchangeable disk magazine, which contains CD disks in receiving compartments that are arranged one above the other. The disk magazine, which is inserted in the manner of a drawer into the disk playback unit housing, is secured in position inside the housing with a latching device.

A CD disk changing unit of the aforementioned type is also known from the not previously published DE 195 19 343 A1, which has several disk drives inside a tower housing that are installed fixedly and cannot be interchanged, as well as several disk magazines that can be inserted one above the other and one beside the other. A transporting device that moves up and down is arranged between the disk magazines and the disk drives. In addition, a disk loading/ejecting drawer is provided on the front of the tower housing.

U.S. Pat. No. 5,206,845 discloses a disk-changing unit with a tower housing, at least one interchangeable disk magazine, at least one interchangeable disk magazine, at least one disk drive and, if applicable, one disk loading/ejecting drawer, which have respectively the same outside dimensions and can be interchanged or added in the manner of modules by inserting them or removing them from respective receiving bays.

All of the aforementioned disk changing units or disk playback units have the disadvantage of a rigid arrangement of the disk drives and the disk loading/ejecting drawer inside the tower housing. The disk magazines only are arranged interchangeably, wherein a disk magazine can be replaced only by another one. Such disk changing units or disk playback units consequently have a limited use or they are difficult to handle. However, for many applications it may be necessary for the disk changing unit to have fewer disk magazines and instead have more disk drives or have fewer disk drives and more disk magazines. Frequently, this depends on the amount of data to be filed or information to be retrieved from a data file.

SUMMARY OF THE INVENTION

It is the object of the invention to create a CD disk changing unit of the aforementioned type, which for each operational mode can be fitted individually with disk magazines and, if applicable, a disk loading/ejecting drawer.

This object is solved according to the invention in that the disk magazine and, if applicable, the disk loading/ejecting drawer can be interchanged and/or replaced and/or added while the disk changing unit is operational, wherein the control unit is provided with a control program for indicating the momentary use of a disk and for controlling the release of a corresponding disk magazine so that it can be removed from the tower housing.

Having the same outside dimensions for the electronic components used to access the CD disks makes it possible to interchange, replace or add such components individually, as desired by the user. A disk magazine can thus be replaced easily, for example, with another disk magazine while the disk changing unit is operational. In addition, a disk magazine can be replaced in a modular fashion with a disk drive or vice versa, a disk drive can be replaced with a disk magazine. Furthermore, mockups of the components for accessing the disks can be inserted into the receiving bays, so that optically a fully equipped disk changing unit exists at all times. It is also possible to install more disk magazines, disk drives or disk loading/ejecting drawers in addition to the disk magazines and/or disk drives already inside the tower housing. This modular interchangeability of the electronic components makes it possible to adapt the disk changing unit in an optimum manner to the respective user requirements. For example, a plurality of disk magazines and only a low number of disk drives can be provided if the disk changing unit is primarily used for data file storage, which requires that the storage capacity is kept high. On the other hand, if the goal is primarily to read information out of a data file and/or record on disks, then the disk changing unit can be provided with a larger number of disk drives for reading and/or recording of information from or onto the CD disk while a lower number of disk magazines is provided. The disk changing unit thus can be fitted out completely with modules and can be configured for the most part by the user him-/herself. The disk changing unit can be easily combined with a single-user computer or a server for a network system. In that case, the disk changing unit can be set up next to the computer or server, so that the respective electronic components can be interchanged, replaced or added easily and comfortably. The disk changing unit consequently is easy to handle.

Based on one advantageous modification of the invention, the momentary use or non-use of a disk or the release or non-release of a disk magazine can be indicated with the aid of an indicator element respectively assigned to it. Furthermore, an operating element is preferably assigned to each disk magazine for querying the respective release. When the operating element is actuated, the associated disk magazine is released for removal. While the disk changing unit is operational, it is possible to inquire whether the content of a disk magazine is in use at the moment by actuating a push button. Once the push button is pushed, the control program in the control unit checks whether or not a disk has been removed from the associated disk magazine. If all disks are accommodated in the disk magazine, the associated indicator element is activated and indicates the release of the disk magazine to the user. If the disk magazine is pushed in briefly by hand, a spring-loaded latching device for the disk magazine is released, as a result of which the disk magazine jumps slightly from the receiving bay in the tower housing. Subsequently this disk magazine can be inserted for another disk magazine into the corresponding receiving bay until the latching device secures the disk magazine. If a disk associated with the disk magazine is located outside of the disk magazine, then this disk is requested (e.g. from a disk drive) and stored in the disk magazine, whereupon the disk magazine is released so that it can be unlatched and thus removed. Of course, the aforementioned control program can be used in an analog manner also for the disk drives and/or the disk loading/ejecting drawer. Owing to the fact that the disk magazine can be interchanged and/or replaced and/or added while the disk-changing unit is operational, the disk magazine is automatically connected to corresponding terminal connections once it is inserted, which terminal connections are connected to the control unit.

It makes sense if the receiving bays that are arranged one above the other in the front part and the rear part of the tower housing are respectively surrounded on the side by a guide frame that is secured rigidly to the housing. These receiving bays function to guide the electronic components for accessing the disk into or from the tower housing and, at the same time, comprise the terminal contacts that are connected to the control unit and can be connected to the corresponding mating contacts of the component to be inserted. It is understood that the modules for the receiving bays have identical dimensions, which correspond to those of the components to be inserted. The electronic components for accessing the disk are inserted into the tower housing without requiring complicated screw-connections.

It is preferable if the control unit and a power supply unit are arranged in the lower region of the tower housing. Consequently, these units are located outside of the region for handling the disk magazines, the disk drives and the disk loading/ejecting drawer. Another advantage is that the required, current-carrying cables are reduced to a minimum length and are also located outside of the region for handling the electronic components. For the most part, this prevents any interferences or damage caused by the current-carrying cables.

In accordance with another advantageous embodiment of the invention, additional plug-in slots for plug-in cards that control further operational sequences are provided in the upper region of the tower housing. Thus, it is possible, for example, to insert additional controller plug-in cards or network cards, which make additional operational sequences available to the disk changing unit. As a result, this unit is even more versatile with respect to use.

It makes sense to arrange the operating device on the front of the tower housing, thus making it easier to access and inspect this operating device.

In a further embodiment of the inventive idea, at least the disk magazines can respectively be provided with an electronic identification character, which can be read by the control unit. The identification character read by the control unit is recognized by the software for the associated computer or server. If a disk magazine was removed from the disk changing unit, the user can query the computer via the monitor for a specific CD disk, so that the computer will provide him/her with the information on whether or not the specific CD disk is located inside a disk magazine, inserted into the tower housing and, if not, in which disk magazine the disk is located. The identification character can also be used to issue user rights to the disk magazines.

In addition, at least one of the receiving bays in the front part or rear part of the tower housing can be provided with a printing device or a scanning device. The printing device can inscribe the CD disks or provide them with an identification character. The scanning device can define the inscription or identification character and can transmit the recognized information to an optional peripheral device of the computer system, for optional information processing purposes.

In a further embodiment of the inventive idea, at least the disk magazines can respectively be provided with an electronic identification character, which can be read by the control unit. The identification character read by the control unit is recognized by the software for the associated computer or server. If a disk magazine was removed from the disk changing unit, the user can query the computer via the monitor for a specific CD disk, so that the computer will provide him/her with the information on whether or not the specific CD disk is located inside a disk magazine, inserted into the tower housing and, if not, in which disk magazine the disk is located. The identification character can also be used to issue user rights to the disk magazines.

In addition, at least one of the receiving bays in the front part or rear part of the tower housing can be provided with a printing device or a scanning device. The printing device can inscribe the CD disks or provide them with an identification character. The scanning device can define the inscription or identification character and can transmit the recognized information to an optional peripheral device of the computer system, for optional information processing purposes.

It is understood that the aforementioned and the following features, which are still to be explained, can be used not only in the respectively named combinations, but also in other combinations or by themselves, without leaving the framework of the present invention.

BRIEF DESCRIPTION OF THE DRAWINGS

The invention is explained in further detail in the following with the aid of an embodiment shown in the drawing, wherein.

DETAILED DESCRIPTION OF THE INVENTION

Figure 1:
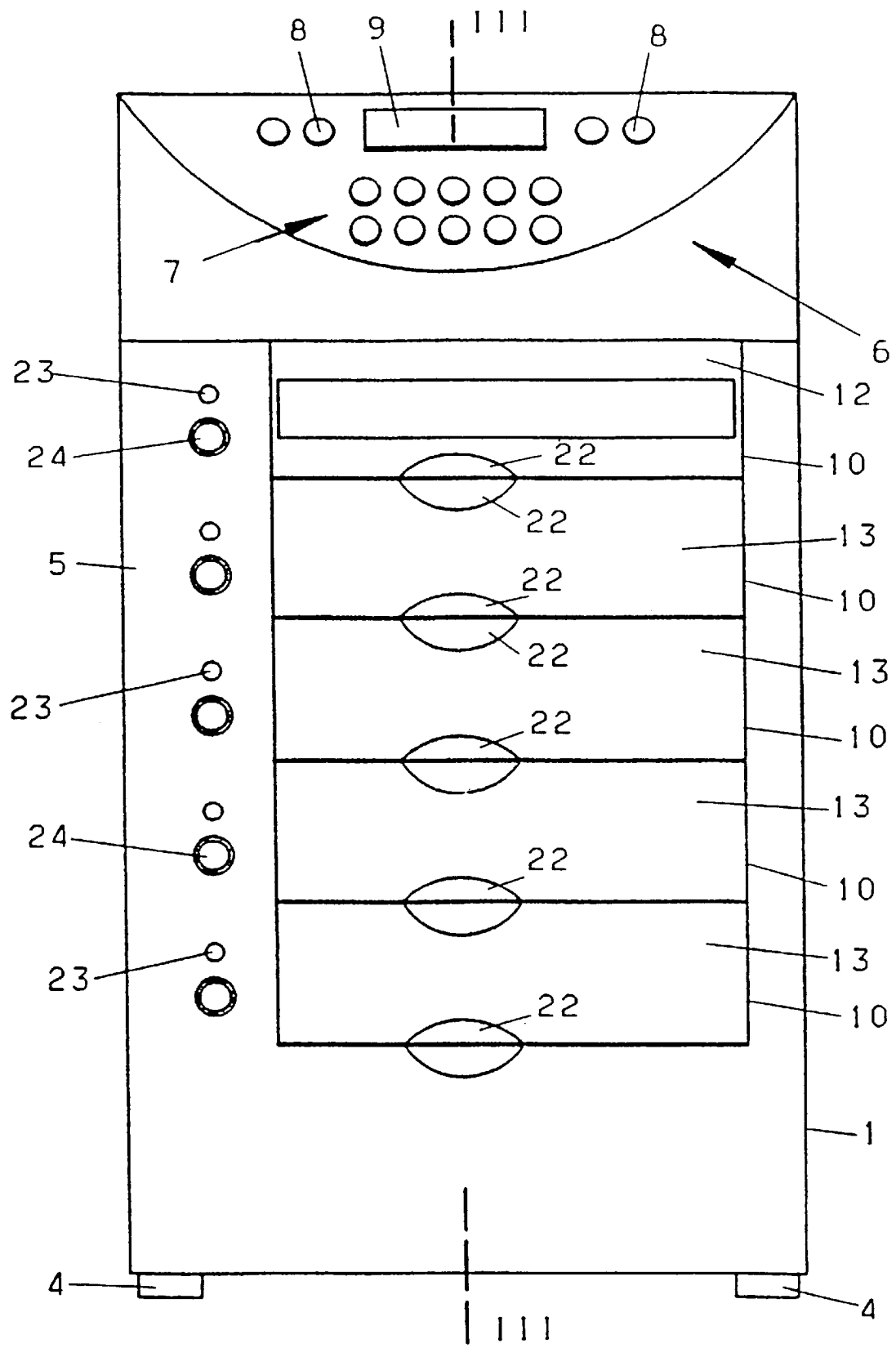
FIG. 1 shows a view from the front of a CD disk changing unit as defined in the invention.
Figure 2:
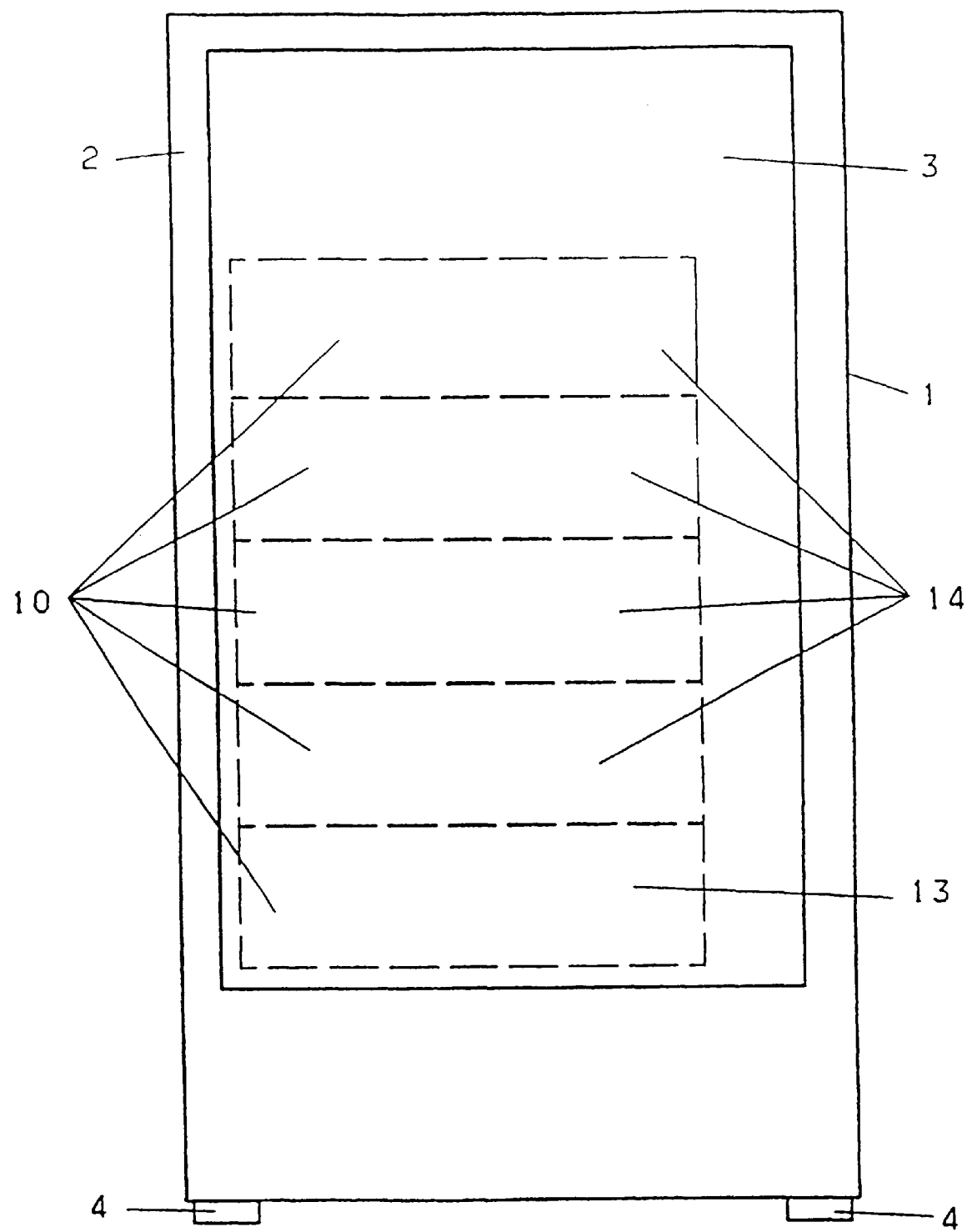
FIG. 2 shows a view from the back of the CD disk changing unit according to FIG. 1, on a reduced scale
Figure 3:
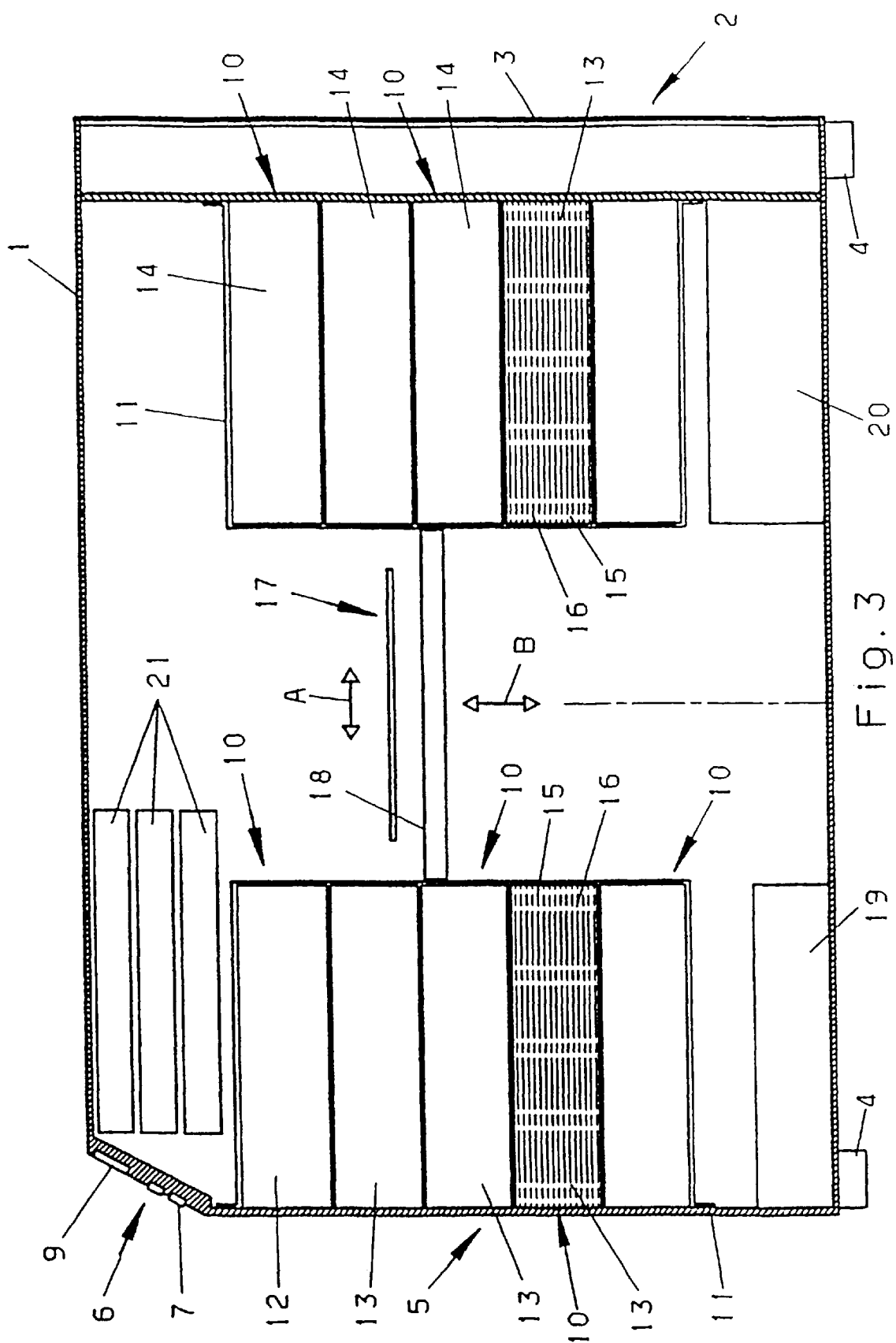
FIG. 3 shows a sectional view from the side of the CD disk changing unit along the line III—III , as shown in FIG. 1, on a reduced scale.

The CD disk changing unit comprises a tower housing 1 with a fold-down door 3 that is attached with hinges to the rear side 2 and opens up to provide access to the inside of the tower housing 1 to make it easier to replace electronic components and also to facilitate the repair and maintenance operations. The four lower corner points of tower housing 1 rest on feet 4, the height of which can be adjusted if necessary to compensate for an uneven ground.

An operating device 6 is provided on the front side 5 of tower housing 1. This operating device 6 comprises a program keyboard 7 as essential component, which is used to program the operating sequence for the CD disk changing unit. The operating device 6 furthermore comprises operating displays and operating keys 8 for indicating the respective operating states and their activation. The operating device 6 furthermore is provided with an indicator display 9, which optically displays the respective program sequence for the CD disk changing unit.

A plurality of modular-type receiving bays 10, stacked one above the other and all having the same internal dimensions, are located on the front 5 of the tower housing 1. Corresponding modular-type receiving bays 10 are also arranged in the rear part of tower housing 1. The receiving bays 10 are respectively enclosed by a guide frame 11, which is connected rigidly to the side of tower housing 1.

The modular receiving bays 10 in the front part and the rear part of the tower housing 1 accommodate a row of electronic components, the outer dimensions of which correspond to the inner dimensions of the receiving bays 10. A disk loading/ejecting drawer 12 is inserted into the top receiving bay 10 on the front 5 of tower housing 1. The four receiving bays 10, arranged underneath it, are respectively provided with a disk magazine 13. The lowest receiving bay 10 in the rear part of the tower housing 1 is also provided with a disk magazine 13. A separate disk drive 14 is inserted into the four receiving bays 10 above it. These disk drives 14 are used for reading and/or recording of information from or onto a CD disk and can therefore be configured as reading and/or recording disk drives. The disk magazines 13 respectively comprise a plurality of receiving compartments 15, arranged one above the other, for storing a corresponding number of disk holders 16 holding one CD disk each. A transporting device 17 for disk holder 16, holding respectively one CD disk is arranged between the receiving bays 10 in the front part and the receiving bays 10 in the rear part of the tower housing 1 and can move up and down along a double arrow B. The transporting device 17 also comprises a carriage 18 that can be moved back and forth in the direction of double arrow A and is used to move a disk holder 16 into and from the transporting device 17. Thus, the transporting device 17 is capable of moving a disk holder 16 with CD disk optionally back and forth between the disk magazines 13, the disk drives 14 and the disk loading/ejecting drawer 12.

A computer-controlled control unit 19 for controlling the operational sequence of the CD disk changing unit is arranged below the modular receiving bays 10 in the front part of tower housing 1. In addition, a power supply unit 20 for the CD disk changing unit is located below the modular receiving bays 10 in the rear part of tower housing 1. A number of additional plug-in slots 21 for inserting a network card, controller card, etc. are furthermore provided behind the operating device 6 in the upper front part of tower housing 1.

The disk loading/ejecting drawer 12 and the disk magazines 13, which are inserted into the receiving bays 10 on the front side 5 of tower housing 1, have at least one indicated recessed grip 22 on the visible surface, which is designed to make obvious the replaceability of the respective electronic component. An LED display element 23 as well as an associated push button 24 are furthermore located on the front side 5, beside each of these electronic components. The LED display element 23 indicates whether the associated disk magazine 13 is released for removal from the tower housing 1. This release is queried by activating the push button 24. If the respective display element 23 lights up, thus signaling the release, the disk magazine 13 is unlocked by applying manual pressure to the visible surface of the disk magazine, whereupon the disk magazine jumps slightly from the front side 5 of tower housing 1. The disk magazine 13 can subsequently be removed and, if applicable, be replaced.

What is claimed is:

1. A disk changing unit comprising:
   a tower housing with a plurality of receiving bays;
   a plurality of electronic components including at least one interchangeable disk magazine adapted to receive a plurality of disks and at least one disk drive, said plurality of electronic components being insertable in a corresponding one of said plurality of receiving bays and having the same external dimensions so that said at least one disk magazine and said at least one disk drive can be interchanged with one another and/or replaced and/or added in the manner of modules by pushing-in or pulling-out the electronic components into or from corresponding receiving bays;
   a transporting device for transporting a selected disk from the at least one disk magazine between the at least one disk magazine and the at least one disk drive;
   an operating device; and
   a computer-controlled control unit for controlling an operational sequence of the disk changing unit wherein said at least one disk drive can be interchanged and/or replaced and/or added while the disk changing unit is operational, and the control unit is provided with a control program for indicating the momentary use of the selected disk and for controlling the release of a corresponding disk drive for removal from the tower housing.

2. A disk changing unit according to claim 1, wherein the momentary use or non-use of the selected disk or the release or non-release of the associated disk magazine can be indicated by means of a respectively associated indicator element.

3. A disk changing unit according to claim 1, wherein an operating element for querying the respective release is coordinated with each disk magazine of the at least one disk magazine.

4. A disk changing unit according to claim 3, wherein the corresponding, disk magazine is released for removal by actuating the operating element.

5. The disk changing unit according to claim 1 wherein the control unit is provided with a control program for controlling the release of the at least one disk magazine so that the at least one disk magazine can be removed from the tower housing, the at least one disk magazine being released in that manual pressure is applied to its visible surface on the front.

6. A disk changing unit according to claim 1, wherein the at least one disk magazine, the at least one disk drive, and/or a disk loading/ejecting drawer are arranged in the manner of modules in a front part of the tower housing of and can be interchanged and/or replaced and/or added from a front side of the tower housing (1).

7. A disk changing unit according to claim 1, characterized in that additional disk magazines and/or disk drives are arranged in the manner of modules in a rear part of the tower housing and can be interchanged and/or replaced and/or added from a rear side of the tower housing.

8. A disk changing unit according to claim 1, wherein the transporting device is arranged between the at least one disk magazine, and the at least one disk drive, which are respectively arranged in one of a front part and in a rear part of the tower housing.

9. A disk changing unit according to claims 1, wherein a rear side of the tower housing has a fold-down door.

10. A disk changing unit according to claim 1, wherein the receiving bays, which are arranged one above the other in a front part and a rear part of the tower housing, are respectively surrounded on the side by a guide frame that is secured rigidly to the tower housing.

11. A disk changing unit according to claim 1, wherein the control unit and a power supply unit are arranged in a lower region of the tower housing.

12. A disk changing unit according to claim 1, wherein additional plug-in slots are provided in an upper region of the tower housing for plug-in cards that control additional operational sequences.

13. A disk changing unit according to claim 1, wherein the operating device is arranged on a front side of the tower housing.

14. A disk changing unit according to claim 1, wherein the operational sequence of the disk changing unit are interrupted when a door on a rear side of the tower housing is opened.

15. A disk changing unit according to claim 1, wherein said at least one disk magazine is provided with an electronic identification character, which can be read by the control unit.

16. A disk changing unit according to claim 1, wherein at least one of the plurality of receiving bays in a front part or a rear part of the tower housing is provided for accommodating a printing device or a scanning device.

17. The disk changing unit according to claim 1, wherein the disk changing unit is adapted for CD disks and the selected disks are CD disks.

18. The disk changing unit according to claim 1, wherein the electronic components further include a disk loading/ejecting drawer, said disk loading/ejecting drawer being interchangeable with one of the at least one disk magazine and the at least one disk drive and/or replaced and/or added in the manner of modules by inserting or removing the disk loading/ejecting drawer into or from a corresponding receiving bay, said transporting device transporting a selected disk between said disk loading/ejecting drawer and one of the at least one disk magazine and the at least one disk drive.

19. The disk changing unit according to claim 18, wherein said disk loading/ejecting drawer can be interchanged and/or replaced and/or added while the disk changing unit is operational.

* * * * *